United States Patent [19]

Miller

[11] 4,072,943

[45] Feb. 7, 1978

[54] MULTI-TARGET TRACKER

[75] Inventor: Jeffrey Ellis Miller, Dallas, Tex.

[73] Assignee: RCA Corporation, New York, N.Y.

[21] Appl. No.: 643,481

[22] Filed: Dec. 22, 1975

[30] Foreign Application Priority Data

Apr. 14, 1975 United Kingdom ............... 15220/75

[51] Int. Cl.² ............................................. G01S 9/56
[52] U.S. Cl. ................................. 343/6.5 LC; 343/7.3
[58] Field of Search ........................... 343/6.5 LC, 7.3

[56] References Cited

U.S. PATENT DOCUMENTS 3,699,573  10/1972  Andrews et al. ...................... 343/7.3
3,803,604   4/1974  Case ..................................... 343/7.3
3,900,848   8/1975  Mears ................................... 343/7.3

Primary Examiner—T.H. Tubbesing
Attorney, Agent, or Firm—Joseph D. Lazar; H. Christoffersen; Edward J. Norton

[57] ABSTRACT

A digital tracker in a cooperative collision avoidance system utilizing time division techniques, which is capable of generating track gates and determining critical values of tau (time to collision) for at least 16 targets during the same time frame, the maximum number of targets being limited essentially by the size of the logic memory elements used and the maximum range desired.

3 Claims, 4 Drawing Figures

MULTI-TARGET TRACKER

CROSS REFERENCE TO RELATED APPLICATIONS

Of interest are the following copending patent applications: Ser. No. 569,995, now U.S. Pat. No. 4,003,050, filed Apr. 21, 1975, entitled "Full Range Correlator for Use in a Collision Avoidance System," based on the invention of J. E. Miller; Ser. No. 643,478 filed on Dec. 22, 1975 entitled "Multiple Tracker with Capability of Tracking Co-Range Targets," based on the invention of W. L. Ross; and Ser. No. 643,479, now U.S. Pat. No. 4,016,564 filed on Dec. 22, 1976, entitled "Multiple Target Data Receiver for a Collision Avoidance System," based on the invention of W. L. Ross, all applications having been assigned to the same assignee as the assignee of the present application.

BACKGROUND OF THE INVENTION

1. Field of the Invention

This invention relates to a digital tracker of aircraft to provide range and critical values of time (tau) to collision in a collision avoidance system for at least 16 substantially simultaneous targets.

2. Description of the Prior Art

Collision avoidance systems have been proposed as means of preventing collision by vehicles both of the maritime vessel type and of the airborne type. Cooperative systems of the asynchronous type include interrogator-transponder techniques in which interrogation signals or probes are transmitted from one vehicle on a random basis. Vehicles in the vicinity receiving such probes respond with signals of various indicia to provide to the interrogation vessel information relating to both range and information identifying the vessel and its position. In airborne systems such information may include the relative or actual altitude of the aircraft.

An existing collision avoidance system known by the acronym SECANT (Separation Control of Aircraft by NonSynchronous Techniques) employs probes identified by any one of a plurality of frequencies and replies using different frequencies of the same band but arranged into a predetermined correspondence to a particular probe frequency. Special correlation techniques aboard any vehicle separate the true reply to its probes received from received reply signals induced by probes from remote vessels, the latter replies being generally identified as "fruit." Such a system is described in U.S. patents Nos. 3,755,811 issued Aug. 28, 1973, and 3,803,609, issued Apr. 9, 1974, based on the invention of Jack Breckman as well as U.S. Pat. No. 3,803,604 issued Apr. 9, 1974, to Bernard Case.

In such collision avoidance systems, the ability to track more than one target at a time depends upon expanding the hardware of the system to accommodate each additional target to be tracked. Such an arrangement for multiple target tracking is not only complex but costly due to the additional hardware required.

SUMMARY OF THE INVENTION

According to the present invention, a digital tracker for a vehicular collision avoidance system is provided with means for serially tracking each of a group of detected targets during a probe interval, which may have a duration of only one millisecond and determining critical values of the time to collision for each. The tracking means includes sequential storage means for storing in individual stages thereof, corresponding to the relative range of each target, a digital bit signal that is served to generate a track gate signal to enable a track gate in coincidence with the reply signals of each of the plurality of remote vehicles being tracked.

BRIEF DESCRIPTION OF A PREFERRED EMBODIMENT

A typical collision avoidance system preferably of the SECANT type is described in the above-identified Breckman patents. A digital tracker useful in such a SECANT system is described in the above-identified digital tracker patent of Bernard Case. Such a system provides for a transmission of a probe form an interrogating vehicle such as an aircraft in the environment of other aircraft similarly equipped with its own transponder. Upon the receipt of each probe signal, a vehicle in the vicinity sends back a reply signal to the environment. Such reply signals are received by other aircraft as well as the original or interrogating (probe transmitting) aircraft. The signals received by the interrogating aircraft are correlated in accordance with the principles discussed in the above patents to identify the identifying target aircraft that should be tracked for further data concerning such aircraft. A threatening aircraft is identified when it has a ratio of range to closing range rate approaching a critical value of time, that is the time to potential collision (known as tau) with the interrogating aircraft.

The track cycle for tracking such identified aircraft is suitably divided into three periods for suitable data accumulation, more particularly, the data concerning the range and the range rate. The circuitry for achieving such data is based on a suitable mathematical algorithm such as described in U.S. Pat. No. 3,893,112, entitled "Computer for Threshold of Tau," issued to J. E. Miller. The implementation of the computer in a tracker of the type described above is achieved in a serial relation whereby one target at a time is tracked and the data of range rate is determined in such serial fashion. The multi-target tracker of the present invention implements the algorithm described in that patent but in a time divided logic form to provide thereby for the determination of the tau many targets during the same time frame.

Figure 1A:
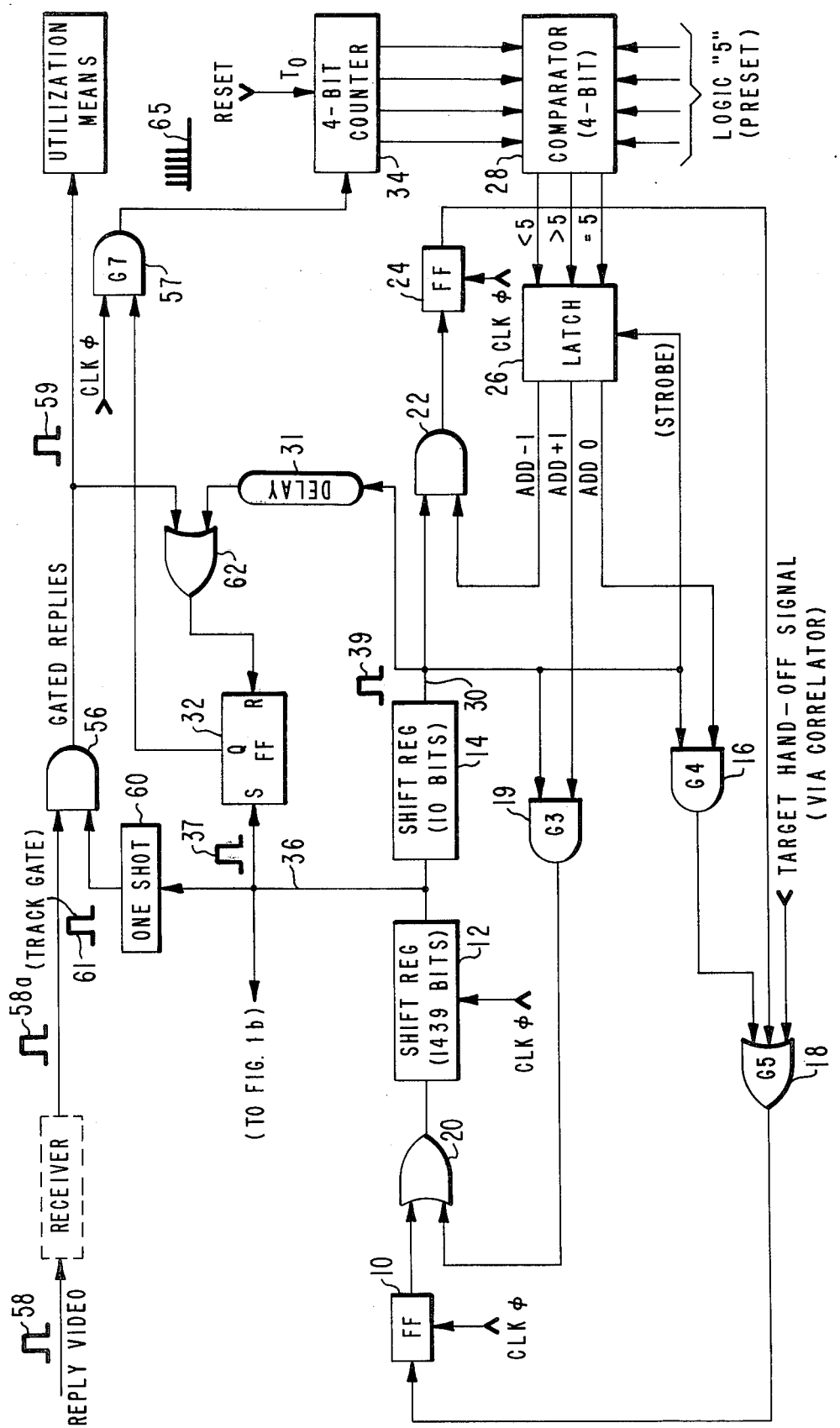
FIGS. 1a and 1b comprise together, a simplified block diagram of a digital tracker embodying the present invention.
Figure 1B:
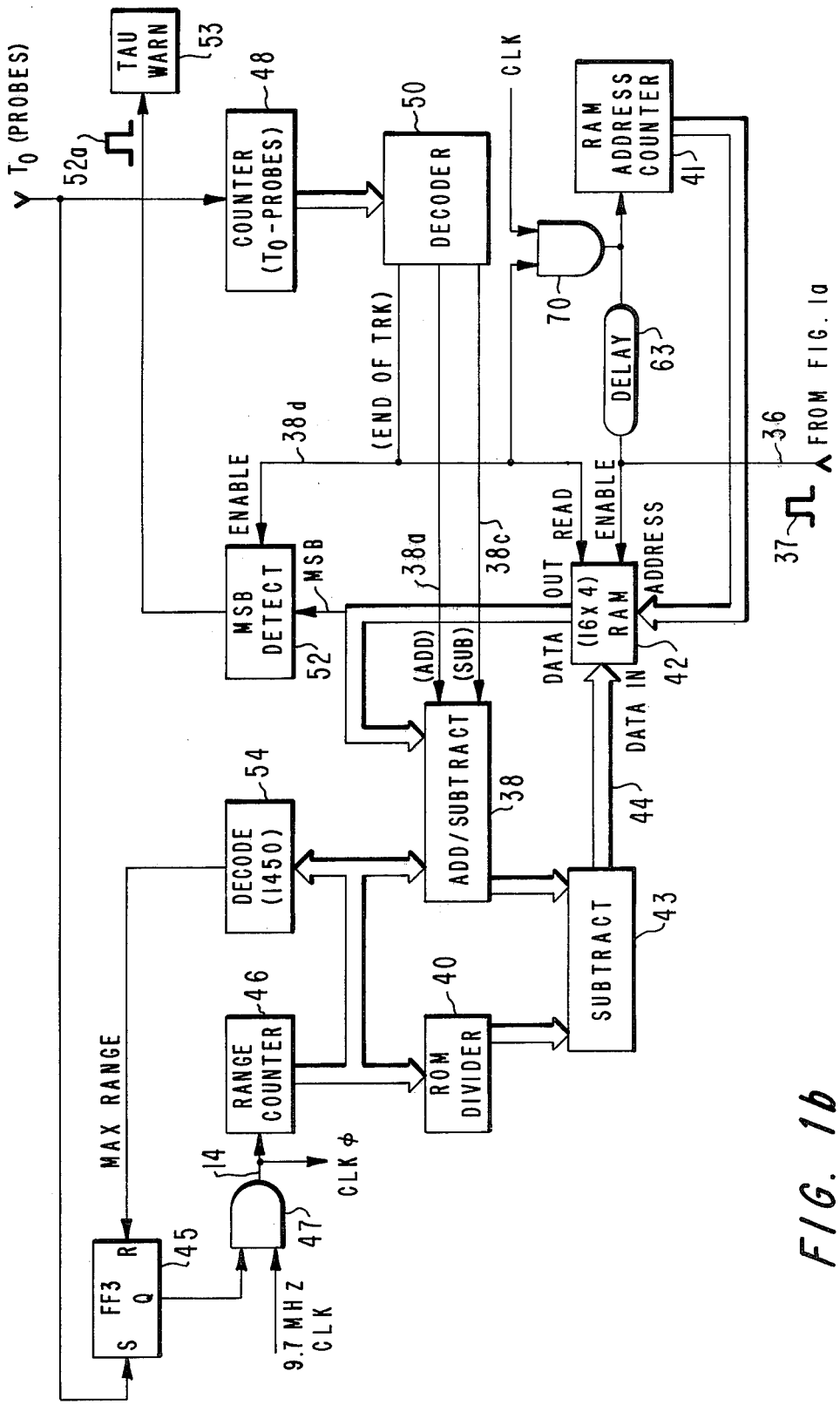

Reference is made to the block diagram of FIGS. 1a and 1b showing the organization and arrangement of components of an embodiment of a multi-target tracker in accordance with the present invention. It is assumed that the system is provided with a local timing source of clocking pulses identified as $T_0$ which are generated approximately once every millisecond, each such pulse being the reference for the timing system of the interrogating aircraft. It is further assumed that suitable equipment is provided for transmitting in response to clocking pulses $T_0$ interrogation pulses to the environment as probes and that such probes elicit reply signals from vehicles such as aircraft in the environment. Such reply video signals (58) are returned and suitably received, processed, and identified as reply signals. Replies 58 are thresholded and suitably detected as signals 58a. A suitable receiver is described in U.S. Pat. No. 3,848,191 issued to L. Anderson, Nov. 12, 1974. The $T_0$ signal is received and applied simultaneously to several of the components forming the present circuit, more particularly, a flip-flop 45 and a counter 48 (FIG. 1b). Probe $T_0$, when applied as the set of flip-flop 45 generates a Q output which is applied to the AND gate 47 which is gated by a 9.7 MHz clock. The output of gate 47 serves as the system clocking signal 11.

Clock signal 11 is applied to FF 10 to FF 24 and to shift register 12. The output of flip-flop and the output of AND gate 19 are 10 passed through an OR gate 20 as the input to shift register 12. The output of shift register 12 is applied to a 10 bit shift register 14 and a one microsecond one shot 60, the output of which is the track gate signal 61 of the system. Track gate signal 61 is applied as one input to two input AND gate 56 which generates gated replies 59 when coincident with the thresholded reply signal 58a. Shift register 14 generates on bus 30, the respective inputs to AND gates 16, 19, 22 as well as the strobing input to a delay 31 and latch 26. AND gate 16 when coincident with a logical one from the output of latch 26 that is called "add 0," generates an input for an OR gate 18 which controls the actuation of flip-flop 10. In addition, OR gate 18 may be energized by the output of flip-flop 24 or a hand-off signal from the correlator. Such a correlator is described either in U.S. Pat. No. 3,887,916 issued June 3, 1975, to R. B. Goyer, entitled "Correlator and Control System for Vehicular Collision Avoidance," or the above-identified application, Ser. No. 569,995. The delay 31 is ORed together in gate 62 with replies 59 from gate 56 and applied to the reset input of flip-flop 32, the Q output of which is applied as one input to AND gate 57 which is clocked by clock pulses 11. The output of gate 57 is applied to a four bit counter 34. The status of counter 34 is compared to a preset reference value of five, the basis for which will be explained, by a four-bit comparator 28 for values which are the same as, greater than, or less than the reference five. Signals resulting from such comparison are applied to a latch 26 to generate respectively the signals: ADD + 1; ADD − 1; and ADD 0. These signals enable (i.e., gate "on") gates 16, 19, or 22.

The multi-tau detector portion of the tracker is shown in FIG. 1b. Gate 47, in addition to generating the system clock signals 11, provides the input to a 12 bit counter 46, the output of which is applied to a ROM 40, an adder/subtractor 38, and a decoder 54. Decoder 54 provides an output which resets FF 45 to limit the range of the system. The respective outputs of ROM 40 and adder/subtractor 38 are applied to subtractor 43, the output of which supplies the data input to a (16 × 4 bit) RAM 42. Adder/subtractor 38 is placed in the add mode during a first portion of the track period under control of decoder 50. It is placed in an idle or inactive mode for a second period by deactivating both the AND and SUB control lines and is placed in the subtract mode during the third portion of the tracking period. Decoder 50 is arranged to respond to the contents of counter 48 which counts probe pulses $T_0$. The decoder may be arranged to generate the ADD, IDLE, and SUB time intervals by counting three equal periods of 250 probe signals totalling thus, a total track period of 750 probes. Any other suitable program, however, may be selected to suit the system needs.

Before proceding with a detailed description of the operation of the multi-target tracker, the implementation of and the algorithm upon which the computations are made will be described. See U.S. Pat. No. 3,893,112, issued July 1, 1975, for a "Computer for Threshold of Tau," describing one form of an algorithm for tau for a SECANT tracker, and the aforesaid copending application of W. L. Ross Ser. No. 643,479 for another form of tau computer algorithm.

The multi-tau detector implemented in accordance with FIG. 1b, detects for each of a plurality of targets, the occurrence of a target tau that is less than a critical preset value. This is accomplished by activating the computer formed of ROM 40, adder/subtractor 38, subtractor 43, and RAM 42 to compute tau information whenever a target bit 37 from shift register 12 is shifted out over path 36. The number for counter 46 represents range in 50 foot increments. This number is divided by an appropriate constant by utilizing a read only memory (ROM) 40 as a look-up table for division. Using adder/sub 38, the range is also added to or subtracted from the previous value stored in RAM 42. The ROM (49) output is then subtracted from the adder/subtractor 38 and the final result indicated by output 44 is written back into the same address as the data input of RAM 42. Each RAM 42 address contains the tau information for each target. In this way the equation:

$$(10Ra - \frac{1}{\tau}(r_a) - \frac{1}{\tau}r_b - (10\,Rc + \frac{1}{\tau}r_c) > 0 \tag{1}$$

is solved for each target with $Ra = r_a$ and $Rc = r_c$. In equation (1), Ra and Rc are respectively the actual ranges determined during the counting or tracking periods, identified as $a$ and $c$; $r_a$, $r_b$, and $r_c$ are the gate range counts for the three tracking periods; and $\tau$ (tau) is the critical time to potential collision. Thus, dividing both sides of equation (1) by 10 results in:

$$Ra - \frac{1}{10\tau}Ra - \frac{1}{10\tau}Rb - (Rc + \frac{1}{10\tau}Rc) > 0 \tag{2}$$

In the tau computer, counter 46 represents the instant range (Rx) during each track portion; ROM 40 divides by 10 $\tau$ and adder/subtractor 38 performs the computation of $R_x \pm R_x/10\,\tau$, where $x$ = track periods $a$, $b$, or $c$.

The circuit being described shown provides for a 12 mile range with a 50 foot resolution for each bit in shift register 12, the 12 mile range being determined from the calculation of 50 feet × 1440 (bits) = 72,000 feet = 12 nautical miles. Flip-flop 10 (one bit) and shift register 12 (1439 bits) comprise together a 1440 bit shift register. The clock of the system is nominally 10 MHz, preferably 9.71252 MHz,) each clock pulse thus representing about 100 nanoseconds or 50 feet. A logic 1 in a stage of shift register 12 represents a target and a logic zero represents the absence of a target. The tracker advances each target bit one stage to represent an advance of 50 feet, essentially "moves back" one bit for a regression of 50 feet, or remains in position for no change in range. These functions are achieved by means of recirculation or feedback paths. Gates 19 and 20, are in the path to advance each target bit by one bit, gates 16 and 18 and flip-flop 10 are in the no-change bit path, and gates 22, flip-flop 24, gate 18, and flip-flop 10 are in the path for effectively moving a target bit back one position.

The control signals to govern whether a target bit will be advanced, is moved back, or left unchanged are the +1, −1, and 0 signals applied to gates 19, 22, and 16 generated by latch 26 when the output of the four bit comparator 28 is sampled. Sampling occurs when a target bit 39 appears at the shift register 14 output bus 30. The output of shift register 14 effects a 10 bit delay subsequent to the presence of the same target bit 37 on bus 36 of shift register 12. A 10 bit delay is chosen to allow for the complete operation of the counter 34, comparator 28, and latch 26. Counter 34 essentially quantizes the time interval in 50-foot increments between the track gate signal 61, that is, the output of shift register 12 on bus 36 and the target reply 58a. For a one microsecond track gate (61), a centered target (58a) will generate a count of "5" in counter 34, since a one microsecond signal quantized into 10 MHz counts (65) will count to five for the first half of the signal so-centered. Thus, a track gate 61 not centered will generate a quantized count greater than five if it is early and less than five if late relative to the centered position.

It will be noted that adder/subtractor 38 and ROM 40 are used to compute equation (2) in parallel rather than serial form, storing the required RAM 42 tau information, as will be described.

DESCRIPTION OF OPERATION

Figure 2:
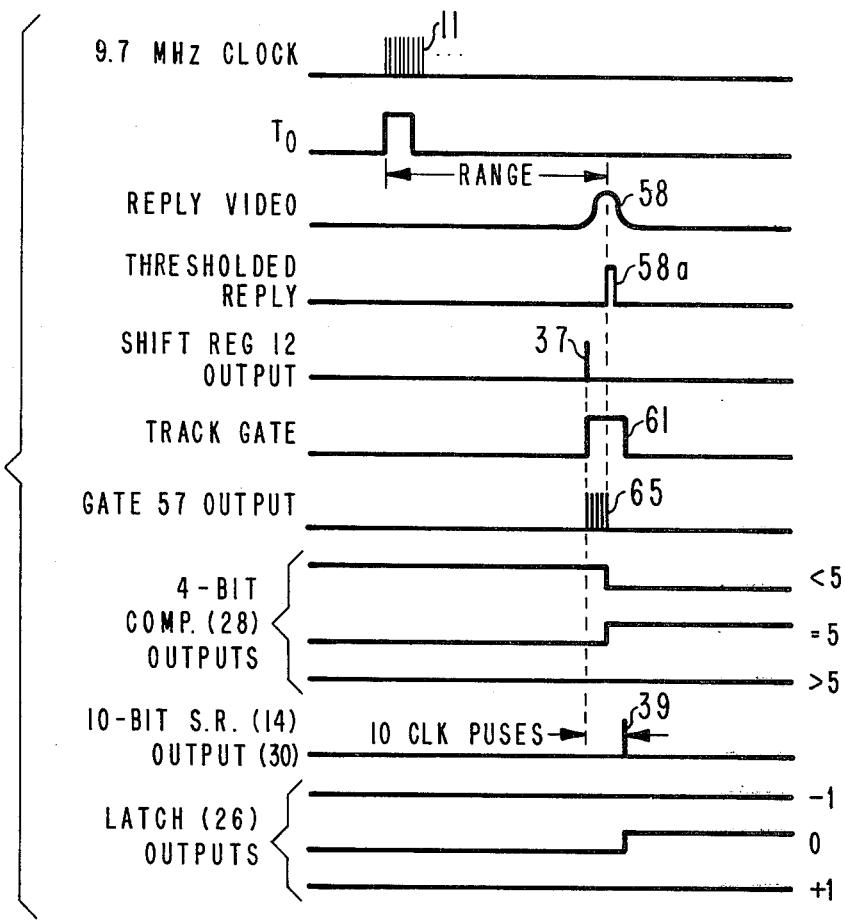
FIGS. 2 and 3 are diagrams of waveforms in timed relation illustrating the operation of the system embodied in FIGS. 1a and 1b.
Figure 3:
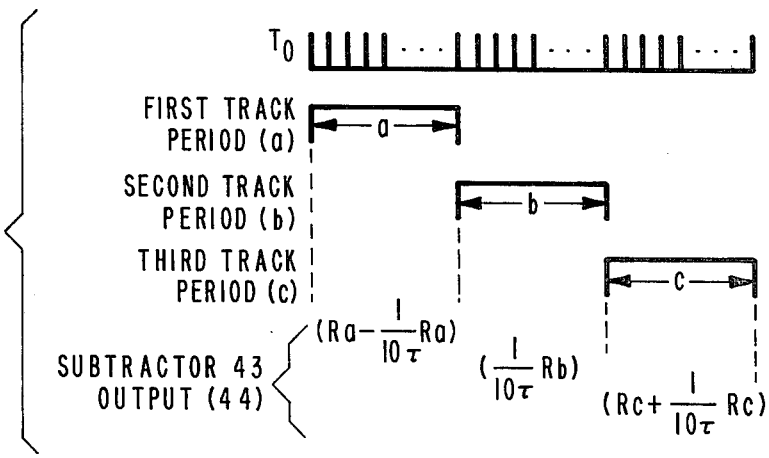

The circuit as shown in FIG. 1a and 1b together with the timing and waveform diagrams of FIGS. 2 and 3 assume that an aircraft is probing its surroundings with an appropriate P or Q type probe responsive to probe signals $T_0$ approximately 1,000 times per second, each probe having a duration of approximately one microsecond. Replies 58 have been suitably correlated and identified as a threatening target and have been processed as a threshold reply signal 58a.

A signal representing a target is introduced into the tracker by the correlator during a hand-off period comprising one or more probe periods, as a "hand-off" signal for each target via OR gate 18, which signal, in turn, is shifted into shift register 12 via FF 10 and OR gate 20. Target bits are thus initiated to provide the track gate to gate into the tracker subsequent replies of the same target in response to subsequent probes.

In brief, such subsequent signals 58 representing targets are introduced into the tracker as a digital bit via gate 56, FF 32, gate 57, counter 34, comparator 28, latch 26, one or more of gates 16, 18, 19, 20, 22 and FF 10 and 24 and then shifted as a target bit through shift registers 12 and 14. The target bit is advanced out of the shift register 12 and further sampled via shift register 14 to provide a servoing signal in the servo loop to track on subsequent replies corresponding to that target. The target bit is circulated back into the servo loop via one shot 60.

More specifically, a target reply 58a will be identified as a gated reply 59 by AND gate 56 when the track gate signal 61 is generated by one microsecond one shot 60 responding to each target bit 37 from shift register 12. The gated reply 59 is applied to flip-flop 32 via OR gate 62 as the reset control, FF 32 having been set by each target bit 37. When coincident with the clock input to gate 57, flip-flop 32 on being set by each bit 37 provides an input quantizing count 65 to counter 34. Counter 34 accumulates a count to compare to a preset value of five of comparator 28. For values less than, equal to, or greater than, that value of five, latch 26 stores an appropriate control signal for gating gates 19, 16, and 22 when subsequently strobed.

A logic 1 received in shift register 12 via OR gate 20 identifies a target, while the absence of a gated input to the shift register 12 manifests the absence of a target. Each bit position of shift register 12 represents a bin or range interval in 50 foot increments of the target range from the interrogating vehicle up to a maximum of typically 12 miles. The bit representing the target position is held or stored in shift register 12. Each time there is a target present, there will be a logic one bit 37 generated on bus 36 and applied via delay 63 (FIG. 1b) to RAM address counter 41, which, in turn, will then be incremented by one. In that way, RAM counter 41 will have a count representing the number of targets stored in shift register 12. The output of RAM counter 41 is the address of RAM 42. The input data to RAM 42 consists of the arithmetic logic necessary to implement the basic tau relationship expressed in equation (2) above. This equation is implemented by divider ROM 40, adder/subtractor 38, and subtractor 43 as described above. The range input to these three logic elements is derived from the 12-bit range counter 46. Counter 46 is clocked by the 10 MHz clock via gate 47, which in turn, is gated by FF 45 which is set for each probe period by probes $T_0$. FF 45 is reset at the end of the range of interest determined by decoder 54 which counts, for example, 1450, each count representing 50 feet for a maximum total of about 12 miles. The contents of counter 46 are applied to ROM 40 and adder/subtractor 38 and subtractor 43 to compute the arithmetic algorithm of equation (1). The answer of that computation is represented by data output 44 which is stored in RAM 42. Each time there is a target detected as manifested by a logic one (signal 37) at the output of shift register 12 on bus 36, the output of subtractor 43 is loaded into RAM 42 because, at that time, the output of counter 46 will represent the range of the target then being detected and the output of subtractor 43 will thus be valid computation for that particular target. The address associated with the answer from subtractor 43 will be the number of the target as counted in the RAM address counter 41.

The track cycle is divided into three periods as described above by the probe pulse counter 48 coupled to decoder 50, which in turn, is arranged to generate mode control signals for adder/subtractor 38 and the most significant bit (MSB) detector 52, suitably and AND gate. The algorithm for this track cycle is in brief as follows: During the first one-third of the track period, an addition is required and during the final third of the track period a subtraction is required in accordance with equations (1) and (2). As indicated previously during the second (b) portion of the track period the adder/subtractor 38 is in an idle mode so that only a division by divider 40 is performed (see equation 2 and FIG. 3). Thus, adder/subtractor 38 is gated over lead 38a in the "add" mode in the first (a) third of the track period over lead 38c in the "subtract" mode during the third (c) portion and is gated as the "end of track" via lead 38d at the end of the track cycle. In response to probe pulses $T_0$, the range for all the targets that have been identified in shift register 12 are counted in RAM address counter 41 and processed by the ROM 40, adder/subtractor 38, and subtractor 43. With each succeeding probe pulse $T_0$, previous answers which are stored in RAM 42 are up-dated by either being added or subtracted depending upon the mode of adder/subtractor 38 to effect a new value in subtractor 43, which value is then stored in RAM 42. Thus, there is a continuing up-dating, incrementing, or accumulating new values for the arthmetic operation performed by ROM 40, adder/subtractor 38 and subtractor 43. This process continues until the full track cycle is ended as manifested by the "end of track" signal from decoder 50.

When the track cycle is completed, the final results stored in RAM 42 are suitably scanned target by target in response to the "end of track" signal to determine which ones exceed zero, indicating that the target has a critical value of tau. Such a scan of the RAM 42 is effected by the end of track signal from decoder 50 being clocked into RAM address counter 41 via AND gate 70. Counter 41 will provide the target count address to RAM 42 in sequence. RAM 42 in the read mode by the end of track signal will provide the output for detection for the MSB to identify targets with a critical tau.

MSB detector 52 is used to detect which of the results are greater than zero by identifying the most significant bit of each result stored in RAM 42. Any result greater than zero is indicative that the MSB is zero. Anything less than zero, that is, any negative number, is indicative that the MSB is logical one. The output "tau status" signal 52a from detector 52 provides a tau warning 53 for the critical targets, suitably coupled to any indicator for use by the pilot or as an input to a display panel.

AND gate 56 (FIG. 1a) generates the gated replies 59 serving as an input to flip-flop 32 via OR gate 62. It will be understood that the thresholded replies 58a are passed only as received during the period of the "track gate" signal 61 via the one microsecond one shot 60 triggered by the output signal 37 of shift register 12. Each of the thresholded replies 58a in accordance with one form of a SECANT system utilizing this invention, may also be coded in binary form to provide logical one and logical zero bits for data communication from the replying vehicle to the probing station. Such signals are processed by a suitably receiver and decoder to provide a decoded message represented by a sequence of such replies as described in the aforesaid copending application of W. L. Ross, Ser. No. 643,479.

The waveform diagram of FIG. 2 illustrates the timing relationship of the principal signals of the system. The tracker will generate a plurality of track gate signals 61 for a respective target in a sequence following each probe in an increasing range relation such that the first target has the shorter range. The relation of the track period portions to the probes $T_0$ and the calculation of the algorithm of equation (2) during each such portion is shown in FIG. 3.

What is claimed is:

1. In a radar tracking system of the transponder type wherein reply signals from one or more remote stations are respectively responsive to interrogation signals having a predetermined repetition rate during a selected period, said period being defined by a predetermined number of said interrogation signals, said system including correlator means including means for generating said interrogation signals, and for correlating replies thereto to identify remote stations and to provide, only during a preselected period prior to said selected period, a hand-over signal representing each of such remote stations, a tracker for tracking said reply signals comprising:
track gate means normally disabled responsive when enabled to said reply signals from remote vehicles respondng to said interrogation signals to generate a digital reply signal representing said remote vehicle;

sequential storage means, having a plurality of storage stages, responsive to said hand-over signals to store in one of said storage stages a signal representing each of said remote vehicles in the sequence received and corresponding to the relative range to each of said remote vehicles as manifested by the time of receipt of said hand-over signals, and to advance in a clocked sequence indicative of range following each interrogation signal each said stored signal from one stage to another through a given maximum number of stages representing a predetermined maximum range;

means responsive to said stored signals to generate a track gate enable signal to enable said track gate means at a time substantially coincident with the time of expected reply for each of said remote vehicle reply signals; and servo means further responsive to said stored signals and to said reply signals to generate control signals to servo sequential movement of said stored signals in said storage means such that the relative storage stage of said stored signal is changed to reduce errors of coincidence in the expected reply signal and said track gate enable signal;

said sequential storage means being a shift register clocked at a predetermined rate and having a plurality of stages, including an input and output stage, each stage in sequence corresponding to an increment of range, whereby a plurality of digital reply signals are stored simultaneously in a sequence and location corresponding to the range of each of said remote vehicles, and said track gate enable signal is generated at said output stage of said shift register and coupled to said track gate means.

2. A tracker according to claim 1 wherein said servo means includes another shift register clocked at said predetermined rate having relatively fewer plurality of stages than said first mentioned shift register, each stage in sequence correponding to an increment of range, said another shift register having an input and output stage, said track gate enable signal being coupled to the input stage of said another shift register, whereby said enable signal is sequentially advanced to the output stage, gating means responsive to said enable signal at said output stage to sample said digital reply signal and provide a plurality of sampled signals, and means responsive to said sampled signals for comparing the number of said samples to a reference number whereby the relative range position of said gate enable signal and digital reply signal are determined to generate said control signals.

3. A tracker according to claim 2 further including a range counter responsive to said probe signals, means responsive to said track gate enable signal for counting the number of reply signals from said remote stations, indicative thereby of the number of remote vehicles in a sequence corresponding to the relative range of each vehicle that are stored in said shift register, random access memory (RAM) means having an input address coupled to the vehicle counting means for addressing said RAM in accordance with the vehicle number, arithmetic means responsive to said range counter to determine the average range of each of said remote vehicles after a predetermined number of probes and to provide an address to said RAM corresponding to said average range, means to compare the average range of each of said remote vehicles to a predetermined value and to provide an alarm if an exceedance occurs.

* * * * *